Nov. 14, 1967

G. W. PORGES ET AL 3,352,197

METHOD FOR DETERMINING THE AMOUNT OF PARTICULATE
CONTAMINANTS IN A LIQUID BY
EMPLOYING SERIES FILTERS

Filed May 17, 1963

INVENTORS
GEORGE WOLFGANG PORGES
WILLIAM ALBERT EDWARD STAVES
BY Kenyon, Palmer, Stewart & Estabrook
ATTORNEYS

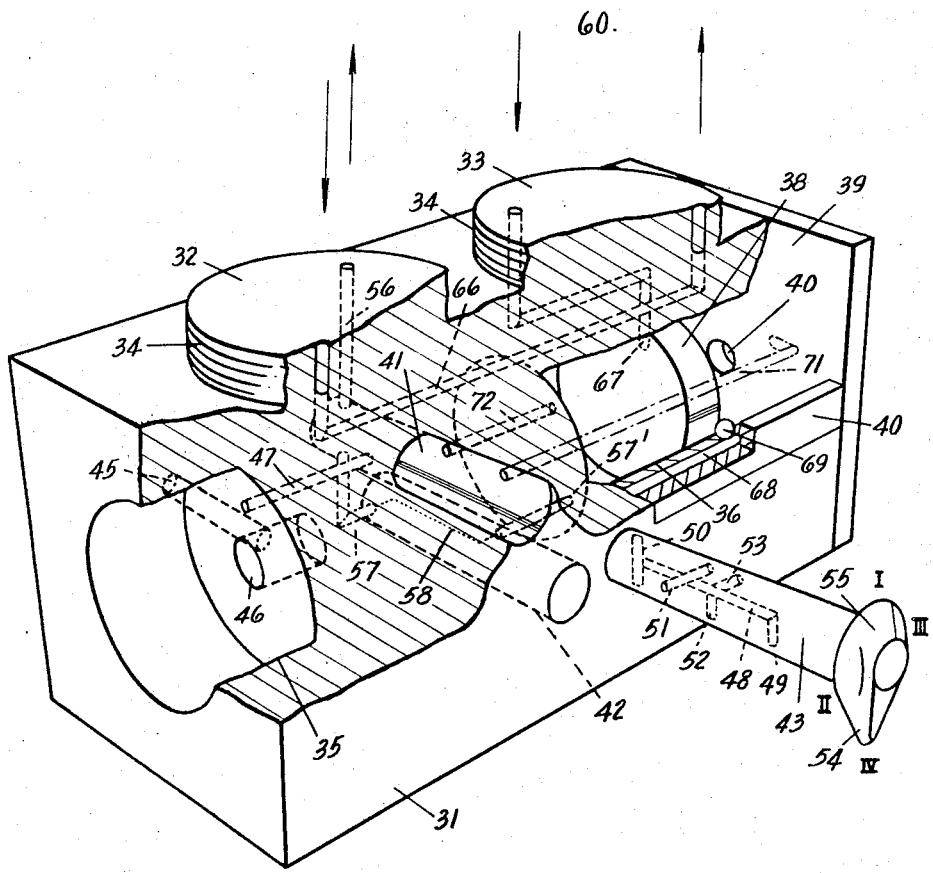

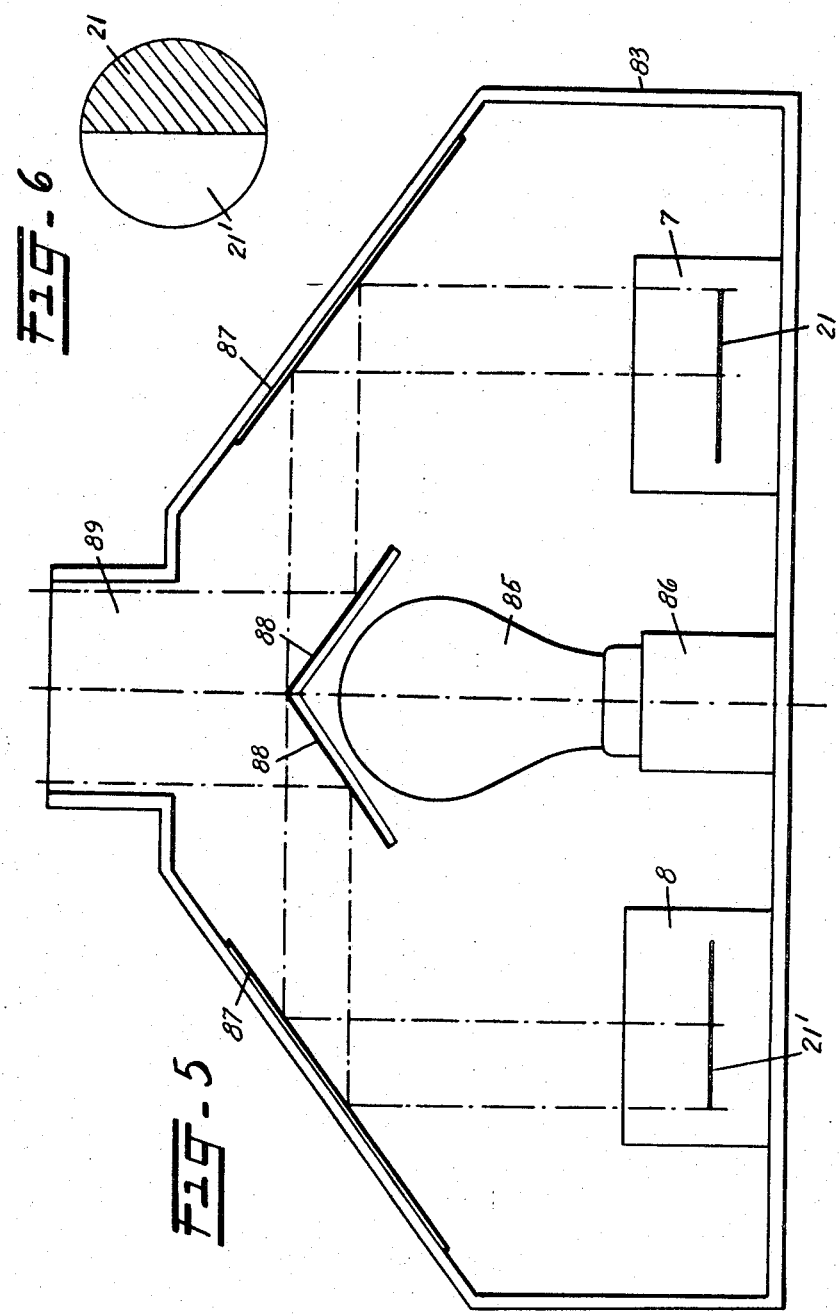

United States Patent Office 3,352,197
Patented Nov. 14, 1967

3,352,197
METHOD FOR DETERMINING THE AMOUNT OF PARTICULATE CONTAMINANTS IN A LIQUID BY EMPLOYING SERIES FILTERS
George Wolfgang Porges, Forest Hills, N.Y., and William Albert Edward Staves, Rotterdam, Netherlands, assignors, by mesne assignments, to California Texas Oil Corporation, New York, N.Y., a corporation of Delaware
Filed May 17, 1963, Ser. No. 281,259
2 Claims. (Cl. 88—14)

The invention relates to continuous visual evaluation of the amount, type, size and color of particulate matter in a liquid stream sample.

According to the invention, our method involves the withdrawal of a continuous proportional sample stream and subsequent filtration in series through identical and visually comparative filter media. The method is unique in that it provides a continuous means of visually monitoring the particulate matter content of a liquid stream through employment of two filter elements connected in series. The first or primary filter element collects particulate matter and the second filter element acts as a color compensator for the pure liquid to permit visual evaluation of the particulate matter collected on the primary filter element as well as serving as a control element to detect passage of particulate matter beyond the primary filter element due to filter rupture or other factors resulting in malfunction of the primary filter element.

The visual evaluation of the significance of particulate matter present in a liquid stream is based on previously established knowledge and experience using analytical techniques to establish a history of primary filter element appearance with regard to quantity of deposit, type, size and color, which could be encountered in a system over the range of operating variables possible. Through reference to established knowledge and experience and selected quality standards, it then becomes possible through visual evaluation of the comparative filters to determine the acceptability or non-acceptability of the particulate matter content of the fluid stream being monitored, and thus, to take immediate corrective action when required. Thus, through reference to prior knowledge and experience, the qualitative aspects of visual appraisal of the primary filter element take on quantitative significance. This discussion of primary filter element evaluation is presented to demonstrate the usefulness of the invention principles and should not be construed as a claim to the technique of filter evaluation through reference to previously established knowledge and experience.

To further demonstrate the usefulness of the principles of the invention, it is to be noted that an important area of application lies in the problem of maintaining aviation turbine fuel cleanliness. A suitable apparatus or device embodying the invention principles may be connected at any point in aviation turbine fuel distribution systems to monitor the particulate matter content of the fuel passing the selected monitoring point. Visual identification of abnormal or undesirable particulate matter contents as to amount, type, size and color would suggest taking immediate corrective action to improve the efficiency of up-stream filtration equipment or product handling techniques. More particularly, employment of the visual evaluation device to continuously monitor aviation turbine fuel discharged into aircraft fuel tanks will contribute significantly to increased safety in aircraft operations since undesirable levels of particulate matter would be immediately apparent to fueling personnel.

The invention will now be further described with reference to the accompanying drawings, wherein:

FIG. 3 shows in perspective and partly in section a more elaborate form of the apparatus;

FIG. 4 shows the filter holder in section;

FIG. 5 shows in a longitudinal sectional view, partly schematic, an optical device for viewing simultaneously the observation filters; and FIG. 6 shows the filter image as it would appear to a viewer.

Figure 1:
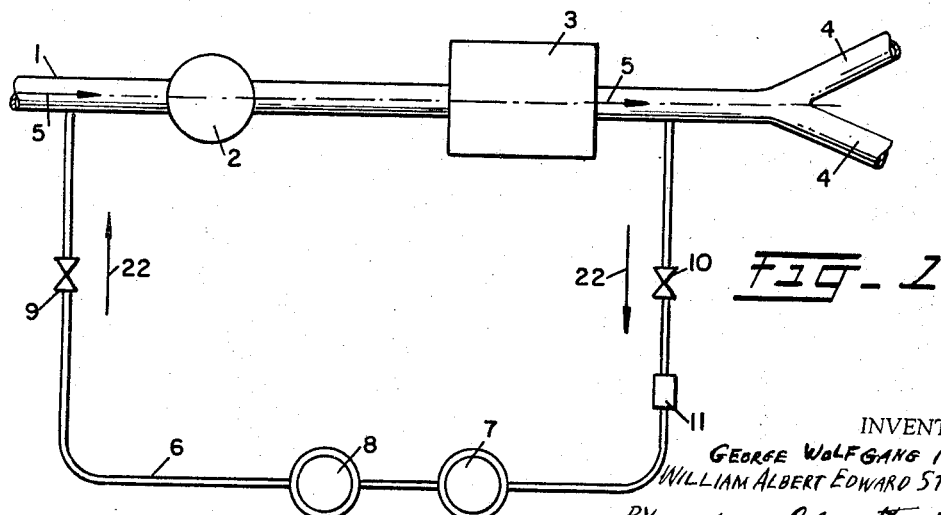
FIG. 1 shows diagrammatically the liquid supply system in which the apparatus according to the invention is included.

Referring to FIG. 1 fuel or other liquid is supplied through a supply conduit 1 from a reservoir (not shown) to a pump 2 and then through a main cleaning filter 3 and by way of a manifold 4 to the fuel tanks (not shown) of an airplane. The direction of flow is indicated by arrows 5.

A by-pass 6, of considerably smaller cross section than the supply conduit 1, is connected to the supply conduit 1 upstream of the pump and downstream of the cleaning filter. Observation filters 7 and 8, series-connected with each other (see also FIG. 2), are included in the by-pass 6. The by-pass 6 further includes valves 9 and 10 and a flow meter 11. The valve 10 in cooperation with the flow meter 11 serves to control the amount of liquid entering the by-pass.

Figure 2:
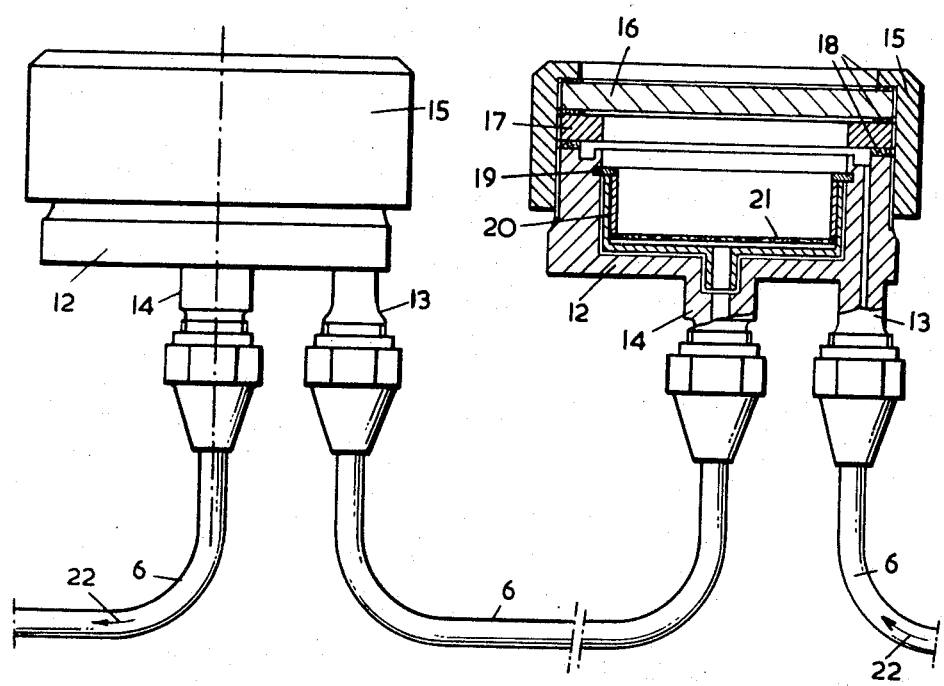
FIG. 2 shows, to an enlarged scale, the observation filters, one of which is shown in cross section.

Referring to FIG. 2, each observation filter has a filter housing 12 with an inlet branch pipe 13 and an outlet branch pipe 14, to which sections of the by-pass 6 are connected. The housing is sealed with a threaded sleeve nut 15 holding a sight glass 16 and a spacing ring 17, as well as interposed gaskets 18. In the lower part of the housing is disposed a filter holder 20, kept in place by a steel split ring 19, for the filter paper 21 which is thus readily replaceable on removal of the split ring and filter holder. The direction of flow in conduit 6 is indicated by arrows 22.

In the more elaborate form of the apparatus shown in FIGS. 3 and 4, we provide a block 31, which is preferably made of aluminum. This block is integrally formed with two round raised solid platforms 32, 33 with screw threads 34 cut in their peripheral sides for screwing on the filter-holders shown in FIG. 4 and to be described hereinafter.

The block 31 is further provided with two large cylindrical recesses 35, 36. Recess 35 is adapted to accommodate a pressure regulator (not shown) which does not form part of the invention. Recess 36 holds a piston 38 and is closed with a cover 39 having an outlet opening 40.

The block further is provided with two large bores 41, 42 and a number of smaller passageways for the fluid to be sampled. In bore 41, to which a number of these passageways are connected, as will be further described, a close-fitting, rotatable, cylindrical plug member 43 is inserted, while a solid cylinder (not shown) having an adjustable throttling valve is inserted in bore 42.

The apparatus shown in FIG. 3 is further best described in the light of its operation.

The fuel or other liquid to be investigated as to its content of solid matter enters through an inlet channel 45 terminating in an extension 46 of the recess 35 for the pressure regulator. After having passed this pressure regulator, the fluid flows through a passageway 47, which terminates in the bore 41 of the plug member 43. This plug member, which can be set in four positions I through IV by being turned about its longitudinal axis through 90° at a time, contains a central longitudinal bore 48 extending over part of its overall length and passes at one end into a transverse half bore 49 and at the other end into a transverse through-bore 50. The bores 49 and 50 have their axes in co-planar relationship. Between the ends of bore 48, another transverse through-bore, 51 and two mutually perpendicular half-bores 52, 53 branch off.

The bore 51 is at right angles to bore 50, while bore 50 is co-planar with bores 49 and 52.

In position I of the plug member 43, indicated by a figure 54 of an operating knob 55, the through-bore 51 is in alignment with passageway 47. The bore 50 forms the connection between passageways 56 and 57, of which 56 terminates in the first raised platform 32 and causes the fluid to flow eventually through the first filter. Passageway 57 terminates in bore 42 for the throttling valve (not shown) and as indicated by the dotted line 58 communicates via passageway 57' with cylindrical recess 36. The other bores 49, 52, 53 are blocked in this position, so that in this position of plug member 43 the sampling of the liquid and the observation of the liquid passing over the filters can be effected. The liquid which has passed the first filter 59 flows via a passage 66 to and down through the second filter. The liquid then enters via a passage 67 the space behind the piston 38, and thence leaves the apparatus by way of the outlet opening 40.

The observation filter shown in FIG. 4 comprises a threaded sleeve ring 61 adapted to screw on platform 32. A detachable threaded inner ring 62 carries a detachable micropore filter membrane 63 which is screwed against a sight glass 64, and further has a discharge channel 65. The observation filter 60 screwed on platform 33 is of similar construction.

Whilst liquid is being passed through the observation filters a small quantity of liquid flows through the throttling valve (not shown) in bore 42 into the cylinder 36 in front of piston 38 whereby the latter is moved towards the cover 39 against the bias of a spring (not shown). When the piston touches cover 39 the outlet opening 40 is closed and no more liquid is sampled. This means that a certain amount of liquid has passed through the supply conduit 1 and the main cleaning filter 3. Therefore the position of the throttling valve in bore 42 determines the amount of liquid passing through the system to be sampled.

If, for any reason, the sampling has to be interrupted the operating knob 55 is turned to position II. In this position all passageways terminating in the bore 41 are closed and the piston 38 remains stationary since a hydraulic lock is created in the passageways 72, 57, 57' and the throttle valve. Sampling can be recontinued when desired by turning the operating knob into position I.

When the sampling is completed, the operating knob is turned into position III, the passage 47 is shut off and via passageway 72 the bores 52, 48, 49, and via a passageway 71 the space in the cylinder 36 in front of the piston 38 are directly connected to the outlet opening 40, from which the liquid is discharged, and the piston 38 is returned to its initial position under the action of the spring (not shown). In this position renewal of the filter membranes may be effected, since no liquid flows through the passageways 56 and 66.

To check the setting and operation of the pressure regulator in recess 35 and of the piston 38, the plug member 43 can be turned to position IV. The bores 48 through 53 are then in the positions shown in the drawing, and liquid flows via passageways and bores 45, 47, 51, 48, 53, 72 to cylinder 36, and—the resistance in the other passageways connected to the plug member being much greater—the piston 38 is rapidly moved to its end position. If the throttling valve in bore 42 is beforehand replaced by a pressure meter, the pressure regulator can then be adjusted.

The piston carries a piece of magnetic material which attracts a steel ball 69 rolling in a slot 68 parallel to the direction of movement of the piston, so that the position of the piston at any given moment can be observed through a glass window.

It is to be noted that provision is made for metering flow rates through the unit so that sample withdrawal, and hence observed particulate matter, can be adjusted to correspond to a given volume flow in the main stream being monitored. In addition, it should be noted that a positive withdrawal sample volume cut-off feature is provided as one means of preserving the comparable nature of prior and succeeding primary filter element evaluations. Furthermore, the unit is so constructed as to permit removal of the filter elements to obtain actual gravimetric determinations, or other analytical evaluations, when desired. This latter feature is particularly important when establishing initial background knowledge and experience with a system for reference purposes in subsequent visual evaluations of the filter elements.

FIG. 5 shows how the two observation filters 7, 8 or 59, 60 are optically coupled in such a manner that the color and the deposit of foreign matter on the filter paper or membrane can be readily compared and observed. With the sight glasses of the observation filters made of circular construction, there is formed by means of the optical arrangement according to FIG. 5 an image as shown in FIG. 6. It is evident from this figure that impurities have deposited on the filter paper 21 of filter 7, the filter paper 21', or filter 8 still being clean.

The optical arrangement comprises a housing 83 which is placed over the observator filters 7, 8 or 59, 60, disposed with the sight glasses upwards. In FIG. 5 the filter papers 21 and 21' are shown schematically. The filter membranes 63 in filters 59, 60 (FIG. 4) would occupy similar positions. Between the two filters is disposed a source of light in the form of an incandescent lamp 85, fitted in a socket 86 mounted on the bottom of housing 83. There are further provided two pairs of parallel, plane mirrors 87, 88 disposed at such an angle to each other that in the ocular orifice 89 the images of the filter paper are superimposed as shown in FIG. 6. The direction of the light beams are indicated by dash-dot lines (90).

The reflective surfaces of the mirrors 87, 88 face each other. The mirrors 88 cover the lamp 85 from above, so that only indirect light falls through the orifice 89.

We claim:
1. A method for evaluation of the amount and characteristics of particulate contaminants in a liquid stream consisting of the following steps in the order named:
   (a) withdrawing a proportional sample of the liquid stream;
   (b) passing said sample through first and second filters in series so as to deposit particulate contaminants on the first filter and impregnate the second filter with the thus filtered sample thereby rendering said second filter a standard for comparison with the first filter; and
   (c) determining the color difference between the two filters while impregnated with said liquid to indicate the amount and characteristics of the particulate contaminants.

2. A method as defined by claim 1 in which said last step comprises visually comparing the color of the two filters.

References Cited

UNITED STATES PATENTS

| | | | |
|---|---|---|---|
| 1,547,182 | 7/1925 | Pulfrich | 88—14 |
| 2,040,066 | 5/1936 | Ursinus | 88—14 |
| 2,072,872 | 3/1937 | Finkelstein | 88—14 |
| 2,692,528 | 10/1954 | Uhl | 88—14 |
| 2,751,779 | 6/1956 | Hodson et al. | 73—38 |
| 2,866,379 | 12/1958 | Veit | 88—14 |
| 3,172,286 | 3/1965 | Grubb et al. | 73—61.4 |
| 3,218,908 | 11/1965 | Armington | 88—14 |
| 3,236,095 | 2/1966 | Gelder | 73—61 |
| 3,240,110 | 3/1966 | Ohlin | 88—14 |

FOREIGN PATENTS 139,424   3/1920   Great Britain.

JEWELL H. PEDERSEN, *Primary Examiner.*

F. SHOON, O. B. CHEW, *Assistant Examiners.*